No. 669,526. Patented Mar. 12, 1901.
J. V. HULSE.
ALINING AND LEVELING DEVICE.
(Application filed July 11, 1899.)
(No Model.)
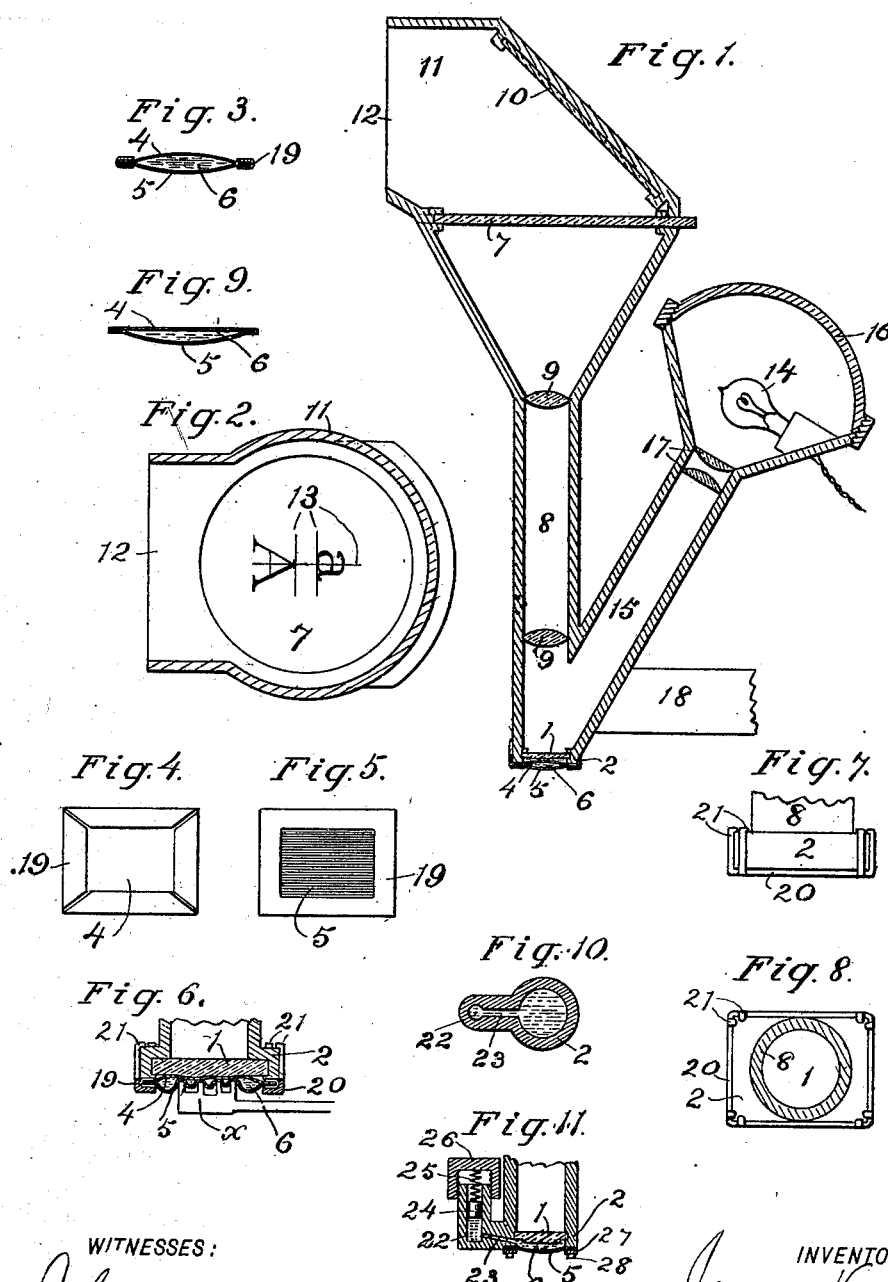

UNITED STATES PATENT OFFICE.

JAMES V. HULSE, OF BROOKLYN, NEW YORK.

ALINING AND LEVELING DEVICE.

SPECIFICATION forming part of Letters Patent No. 669,526, dated March 12, 1901.

Application filed July 11, 1899. Serial No. 723,441. (No model.)

*To all whom it may concern:*

Be it known that I, JAMES V. HULSE, a citizen of the United States, residing at Brooklyn, in the county of Kings and State of New York, have invented certain new and useful Improvements in Alining and Leveling Devices, of which the following is a specification.

This invention relates to improvements in alining and leveling devices, and more particularly to devices of this nature wherein a face of the body to be alined, leveled, or inspected is brought into proximity with a transparent or translucent gage-plate, and obscuring means are provided whereby the said face or any portion thereof is not distinctly visible until it is in direct proximity or contactive relation with the gage. A device of this character is set forth in my application, Serial No. 703,218, filed January 24, 1899, and the present application relates in part to improvements in such device and in part to amplification of features referred to in such application, but not claimed therein.

The objects of the present invention comprise projection of the image of the gage into a more convenient position for inspection, adaptation of the obscuring device for ready removal or attachment, provision for causing the obscuring device to show the presence of the body by a change of color as seen through the gage, and means for rendering the obscuring medium more accurately definitive of the outline of the contacting body, such means consisting of a fluid or displaceable obscuring medium confined by a flexible retaining medium and maintained under pressure.

My invention also comprises certain details of construction, as hereinafter set forth.

In the accompanying drawings, Figure 1 is a vertical section of an alining and leveling gage provided with image-projecting means according to my invention. Fig. 2 is a horizontal section above the screen on which the image is thrown. Fig. 3 is a sectional detail of the detachable obscuring device, and Figs. 4 and 5 are, respectively, top and bottom views thereof. Fig. 6 is a detail sectional view of the obscuring device and gage, and Figs. 7 and 8 are, respectively, side and horizontal views of same, the latter view showing the projecting-tube in section. Fig. 9 shows a modification of the detachable obscuring device. Figs. 10 and 11 are horizontal and vertical sections of a modification of the means for putting the fluid obscuring medium under pressure.

Referring to Figs. 1 and 6, a gage-plate 1, of glass or other transparent substance, is mounted in a frame 2, and on one side of such plate is the obscuring device, consisting of flexible films 4 and 5, with an interposed layer or filling of viscous or fluid obscuring material 6. When a type or other body is pressed up against the obscuring device, as indicated in Fig. 6, it will cause displacement of the displaceable medium 6 and will press the films 4 5 toward the gage-plate 1, so that when viewed from above there will be presented an image of the contacting body. I project the image of the gage and obscuring medium on a suitable screen 7, supported in an enlargement of a tube 8, rising from the frame 2, such projection being effected by any suitable arrangement of lenses, (indicated at 9 9.)

In order to bring the image into still more convenient position for inspection, I provide a mirror 10, arranged at an angle over the screen 7, a hood 11 covering said screen and mirror and being provided with an aperture 12, through which the operator can look into the mirror. It will in general be desirable to adapt the lenses 9 to produce a magnified image of the gage on the screen. The screen 7 is, in case the device is used for type-alining, provided with indicating-lines 13, indicating the correct positions of the type. It is also desirable to provide means for artificial illumination of the gage, and for this purpose I provide an electric lamp or other illuminating device 14, arranged in a tube 15, rising from frame 2 at an angle to tube 8, a reflector 16 and lenses 17 being also provided to direct the light from lamp 14 onto the gage, where it is reflected through lenses 9 onto screen 7, presenting on such screen an image of the type that may be in contact with the gage, as shown in Fig. 2.

The whole device as thus far described may be mounted on a suitable supporting-arm 18, which may be provided with means for support and adjustment to any given position, as shown in the application for patent above referred to.

In order to render this image more readily distinguishable, I prefer to make the film 4, which is toward the gage-plate, translucent and light in color, while the film 5, which is toward the contacting body, is preferably dark in color, and the viscous obscuring medium is an opaque white or light-colored substance. Thus the inner film 4 may be of gold-beater's skin or of the membrane that forms the lining of the intestines of animals, while the outer film 5 may consist of black caoutchouc, and the intervening material 6 may consist of zinc-white made into a paste with castor-oil. Where the type presses the outer film 5 into contact with the inner film 4, it will show black through the gage, while on other places only the white material 6 will be seen. Good results, however, can be obtained by using a black paste—say, for example, lampblack in castor-oil—for the material 6, while using for the film 5 a white flexible substance, such as caoutchouc rendered white in any usual manner, or any other contrasting colors could be used, the result in any case being that the contact of the type causes a change of color as seen through the gage whenever it strikes. In order that the resulting image may be more sharply marked, I prefer to maintain the material within the films 4 5 under pressure, this being effected by forcing in enough of the fluid 6 to distend the flexible films 4 5, and then sealing the films together, the elasticity of the films 5 maintaining the pressure. Consequently when the type is brought into contact, as shown at $x$ in Fig. 6, the pressure of the medium 6 will press the film 5 sharply down over the edges of the type, giving a sharp image.

The films 4 5 are secured together around the edges to form a detachable obscuring device, this being effected by means of a clamp-frame 19, as shown in Fig. 3, or by cementing the edges together, as represented in Fig. 9. If a clamp-frame be used, it may consist of a plate having an open center, as shown in Fig. 5, the films 4 5 being then placed over the open portion and the edges of the plate bent down over the same, as shown in Fig. 4. The detachable obscuring device is held to the supporting-frame 2 by means of a spring-clip frame 20, the obscuring device being first placed against the under side of the gage-plate 1 and the frame 18 then snapped up against it, its spring-fingers 21 snapping over the edges of the frame 2.

Figs. 10 and 11 show a modified form of the obscuring device with means for producing a regulable pressure therein. In this case the fluid or viscous obscuring medium 6 is placed between the glass gage-plate and a single flexible film 5, which in this case need not be elastic, but may be of any flexible material such as above described for film 4. A chamber or cylinder 22 at the side of the gage is connected to the space beneath the gage by a duct 23 and is provided with a piston 24, pressed downward by a spring 25, whose pressure is regulated by a screw-cap 26. The material 6 in this case fills all the space between piston 24 and the gage 1 and presses outwardly on the film 5, so as to distend the latter, and by means of the screw-cap 26 this pressure may be regulated to a nicety. The film 5 in this case is held in place by a frame 27 with fastening-screws 28.

The film 4 of the detachable obscuring device which lies next the gage need not have any great degree of flexibility. Thus it may be of thin transparent mica, which remains substantially flat under the pressure of the viscous medium, as shown in Fig. 9. In this case the image is formed on the gage by the pressure of the obscuring-film 5 against the comparatively unyielding film 4.

In place of or in addition to the lines 13 on the screen 7 I may apply to such screen marks or characters showing the outline to be occupied by the image on the screen when the object to be alined is in proper position. Thus in Fig. 2 the characters $a$ A may represent the marks or characters above referred to. In the case of a type-writer aliner this would involve the use of a multiplicity of screens having the proper characters for the respective types, and in that case the screens would be made removable from the aliner, as by making them slidable laterally in the tube 8, and with their ends projecting, as at 7', to enable them to be grasped by the fingers and removed or inserted at will.

Having thus described my invention, what I claim as new, and desire to secure by Letters Patent, is—

1. The combination with a gage adapted to be brought into close proximity to the body to be gaged, and provided with obscuring means for producing an image of the body while in such close proximity thereto, of means for illuminating the gage, a screen and projecting means for projecting the image of the gage on the screen.

2. The combination with a gage adapted to be brought into close proximity to the body to be gaged, and provided with obscuring means for producing an image in the gage of the body while in such close proximity thereto, of means for illuminating the gage, a screen and magnifying projecting means, for projecting a magnified image of the gage on the screen.

3. The combination with a gage adapted to be brought into close proximity to the body to be gaged, and provided with obscuring means for producing an image in the gage of the body while in such close proximity thereto, of means for illuminating the gage, a screen provided with indicating-lines and magnifying projecting means for projecting a magnified image of the gage on the screen.

4. The combination with a gage of a detachable obscuring device comprising an obscuring-film and means for detachably securing same to the gage.

5. The combination with a gage of a detachable obscuring device therefor, comprising two films of flexible material fastened together, and a fluid obscuring material interposed between same.

6. The combination with a gage, an obscuring device for same, comprising a flexible film and a displaceable fluid obscuring medium under pressure.

7. Means for inspecting or determining the position of an object comprising a gage, provided with an obscuring means adapted to present a change of color on contact of said object.

8. Means for inspecting or determining the position of any object comprising a gage provided with superposed obscuring media of different colors adapted to present a change of color on the approach of said object, one of said media being flexible and the other being displaceable, substantially as set forth.

JAMES V. HULSE.

Witnesses:
ARTHUR P. KNIGHT,
JOSEPH J. SCHMIDT.